US012756615B2

(12) United States Patent
Chandran et al.

(10) Patent No.: US 12,756,615 B2
(45) Date of Patent: Oct. 6, 2026

(54) NETWORK CLUSTER AND TENANT-AWARE HIERARCHICAL PROCESSING SYSTEM FOR DISTRIBUTED QUALITY OF SERVICE

(71) Applicant: Huawei Cloud Computing Technologies Co., Ltd., Gui'an New District (CN)

(72) Inventors: Sugesh Chandran, Dublin (IE); Pei Fang, Dublin (IE)

(73) Assignee: Huawei Cloud Computing Technologies Co., Ltd., Gui'an New District (CN)

( * ) Notice: Subject to any disclaimer, the term of this patent is extended or adjusted under 35 U.S.C. 154(b) by 30 days.

(21) Appl. No.: 19/084,460

(22) Filed: Mar. 19, 2025

(65) Prior Publication Data

US 2025/0279923 A1 Sep. 4, 2025

Related U.S. Application Data

(63) Continuation of application No. PCT/EP2022/075931, filed on Sep. 19, 2022.

(51) Int. Cl.
*H04L 41/044* (2022.01)
*H04L 41/0894* (2022.01)

(52) U.S. Cl.
CPC ........ *H04L 41/044* (2013.01); *H04L 41/0894* (2022.05)

(58) Field of Classification Search
CPC ... H04L 41/044; H04L 41/0894; H04L 47/22; H04L 47/24
See application file for complete search history.

(56) References Cited

U.S. PATENT DOCUMENTS

2009/0059786 A1* 3/2009 Budampati ........... H04W 28/16 370/230
2019/0044832 A1* 2/2019 Deval ................. H04L 41/0816
2021/0117360 A1 4/2021 Kutch et al.
2021/0144096 A1* 5/2021 Plat ..................... H04L 43/0894
2025/0279923 A1* 9/2025 Chandran ............. H04L 41/044

OTHER PUBLICATIONS

Snir et al., "Policy Framework QoS Information Model," Police Framework, Internet Draft, draft-ietf-policy-qos-info-model-01.txt, total 67 pages (Apr. 2000).

* cited by examiner

*Primary Examiner* — David R Lazaro
(74) *Attorney, Agent, or Firm* — Leydig, Voit & Mayer, Ltd.

(57) ABSTRACT

A QoS processing system is for one or more services and includes multiple QoS processing nodes arranged in a hierarchical tree structure with at least two hierarchy levels. A highest hierarchy level includes one or more root nodes, each root node being associated with a set of service instances of the services. A lowest hierarchy level includes multiple leaf nodes, each leaf node being associated with one service instance, each leaf node being a descendant of at least one root node, and service instances of each root node being associated to the leaf nodes that descend from each root node. Each leaf node applies a local QoS policy to its associated service instance, and each root node can apply a first common QoS policy to its set of service instances.

16 Claims, 8 Drawing Sheets

NETWORK CLUSTER AND TENANT-AWARE HIERARCHICAL PROCESSING SYSTEM FOR DISTRIBUTED QUALITY OF SERVICE

CROSS-REFERENCE TO RELATED APPLICATIONS

This application is a continuation of International Application No. PCT/EP2022/075931, filed on Sep. 19, 2022, the disclosure of which is hereby incorporated by reference in its entirety.

FIELD

The present disclosure relates to quality of service (QoS) policies for services. The disclosure provides a QoS processing system for one or more services. The QoS processing system is based on a hierarchical tree structure of QoS processing nodes. The QoS processing system may be used to provide distributed QoS across service instances of one or more services in a network or for different tenants.

BACKGROUND

With the adoption of micro-services, applications can horizontally scale up by simply adding more server instances to the production fleet. However, horizontal scaling introduces many challenges to the service infrastructure, such as how to apply QoS policies across these instances (e.g., service wide policies) without impacting the overall service performance.

Currently, QoS solutions typically rely on a distributed storage to make the collective QoS decision based on the aggregated information from all active nodes. This approach works quite well even for large scale multi-zone applications, however, it is not suitable for multi-tenant service deployments, wherein QoS policies are required to apply at tenant and global level. The noisy neighbour impact is imminent when all these policies share a single distributed storage for the decision making. To alleviate this issue in large service deployments, more than one distributed storage system is used. This model thus comes with its own cost and management overhead.

Most conventional rate-limiter (a QoS parameter) solutions are specifically designed to rate-limit queries to specific services or service instances. One conventional approach is to deploy multiple instances of a rate-limiter solution (e.g., based on a distributed architecture) to distribute the rate-limiter load. However, it is quite cumbersome to manage such a deployment in large scale public cloud systems. The main drawbacks of the conventional rate limiter solutions are thus (1) the dependency on third party distributed storage solutions, (2) scalability, (3) suitability for multi-tenant QoS use cases, such as rate-limiting for OBS, and (4) maintenance, as most of the solution require to maintain a list of different components to do the QoS processing.

SUMMARY

In accordance with an embodiment, the present disclosure provides a QoS processing system can handle hyper-scale multi-tenant workload without using multiple QoS service deployments.

A first aspect of this disclosure provides a QoS processing system for one or more services, the QoS processing system comprising: a plurality of QoS processing nodes arranged in a hierarchical tree structure that includes at least two hierarchy levels; wherein a highest hierarchy level of the at least two hierarchy levels comprises one or more root nodes of the tree structure of the QoS processing nodes, each root node being associated with a set of service instances of the one or more services; wherein a lowest hierarchy level of the at least two hierarchy levels comprises a plurality of leaf nodes of the tree structure of the QoS processing nodes, each leaf node being associated with one service instance of the one or more services, each leaf node being descended from at least one root node, and the service instances of the set of service instances of each root node being associated to the leaf nodes descended from that root node; wherein each leaf node is configured to apply a local QoS policy to its associated service instance; and wherein each root node is configured to apply a first common QoS policy to its set of service instances.

Each single root node—depending how the hierarchical tree structures is designed with processing nodes and connections between them—may be associated with a plurality of leaf nodes and, thus, with a plurality of service instances (since each leaf node is associated with one service instance).

Using the hierarchical tress structure for the QoS processing system of the first aspect, to provide local and/or common QoS policies to service instances of the one or more services, provides several advantages. The QoS processing system of this disclosure is not dependent on third party distributed storage solutions. Further, the QoS processing system is well scalable due to the hierarchical approach. Hierarchy levels can be added and removed as desired. The QoS processing system is also suitable for multi-tenant QoS use cases, such as rate-limiting for object storage (OBS). The QoS processing system is of easy maintenance, as it does not require maintaining a list of different components to do the QoS processing. The QoS processing system can handle hyper-scale multi-tenant workload without using multiple QoS service deployments.

In an implementation form of the first aspect, the hierarchical tree structure includes at least three hierarchy levels and the QoS processing system further comprises: at least one intermediate hierarchy level arranged between the highest and the lowest hierarchy level and comprising a plurality of intermediate nodes of the QoS processing nodes, each intermediate node being descended from at least one root node, each intermediate node being associated with a subset of service instances of the one or more services, and the service instances of the subset of service instances of each intermediate node being associated tot the leaf nodes descended from that intermediate node; wherein each intermediate node is configured to apply a second common QoS policy to its subset of service instances.

The hierarchical tree structure may also comprise four or five hierarchy levels, and each hierarchy level may comprise a plurality of intermediate nodes. The hierarchy level number is not limited, making the QoS processing system well scalable. Different intermediate hierarchy levels can be associated with hosts, clusters, AZs, or similar. Depending on the number of hierarchy levels, more than two common QoS policies can be applied. On each higher hierarchy level, a common QoS policy for a larger set of service instances may be applied.

In an implementation form of the first aspect, each particular QoS processing node of the QoS processing nodes is configured to: collect at least one QoS metric of at least one service instance from each child node of the QoS processing nodes that is directly descended from the particular QoS processing node; aggregate the collected QoS metrics; and provide the aggregated QoS metrics to each parent node of the QoS processing nodes, from which the particular QoS processing node is directly descended.

In this way, the relevant QoS metrics can be distributed to all QoS processing nodes on all hierarchy levels. The root nodes can receive all QoS metrics and can make QoS policy decisions based thereon.

In an implementation form of the first aspect, each particular QoS processing node of the QoS processing nodes is configured to: receive a QoS configuration for at least one service instance from each parent node of the QoS processing nodes, from which the particular QoS processing node is directly descended; and/or provide the received QoS configuration and/or an own QoS configuration for at least one service instance to each child node of the QoS processing nodes, which is directly descended from the particular QoS processing node.

Thus, each QoS processing node on each hierarchy level may receive a QoS configuration, and may, for example, apply a local or common QoS policy according to the QoS configuration.

In an implementation form of the first aspect, each root node is configured to distribute at least one rate limitation parameter for at least one service instance to each QoS processing node that is descended from that root node.

Thus, a rate-limiting solution can be implemented by the QoS processing system.

In an implementation form of the first aspect, each QoS policy, including each local QoS policy, each first common QoS policy and/or each second common QoS policy, is applied based on at least one of: one or more of the QoS metrics of the one or more service instances to which the QoS policy is applied; one or more of the QoS configurations for the one or more service instances to which the QoS policy is applied; one or more of the rate limitation parameters for the one or more service instances to which the QoS policy is applied.

The QoS metrics and QoS configurations can be propagated and distributed through the hierarchy levels as described above, and the QoS policies can be applied accordingly in the hierarchical manner.

In an implementation form of the first aspect, the local QoS policy, the first common QoS policy, and/or the second common QoS policy includes a rate-limiting policy.

In an implementation form of the first aspect, the QoS processing system further comprises a control node configured to allocate and/or reallocate one or more of the plurality of QoS processing nodes in the hierarchical tree structure.

The control node may thus select, based on using some suitable algorithm, the optimum QoS processing nodes.

In an implementation form of the first aspect, the control node is one of the QoS processing nodes of the hierarchical tree structure.

In an implementation form of the first aspect, the control node is configured to perform the allocation and/or the reallocation based on at least one of: a load on the currently allocated QoS processing nodes, the QoS policies applied by the currently allocated QoS processing nodes, a communication cost among the currently allocated QoS processing nodes, a topology of the service instances, and a QoS configuration of each of the service instances.

In an implementation form of the first aspect, each QoS processing node in the hierarchical tree structure is aware of its position in the tree structure and/or comprises information describing the entire hierarchical tree structure.

In an implementation form of the first aspect, the QoS processing nodes in the hierarchical tree structure are configured to perform a consensus protocol to determine which QoS processing node is responsible for which QoS policy and/or a sharing of one or more QoS policies using the hierarchical tree structure.

In an implementation form of the first aspect, the control node is further configured to report an allocation and/or a reallocation of the one or more QoS processing nodes to all the QoS processing nodes.

The QoS processing nodes may apply their local and/or common QoS policies based further on their position in the tree structure, and/or based on the outcome of the consensus protocol, and/or the report of allocation and/or reallocation.

In an implementation form of the first aspect, the hierarchical tree structure includes four hierarchy levels and wherein: each QoS processing node of the lowest hierarchy level is associated with one service instance of the one or more services of one host of a plurality of hosts, each host executing one or more service instances of the one or more services; each QoS processing node of a first intermediate hierarchy level above the lowest hierarchy level is associated with all the service instances of one host; each QoS processing node in a second intermediate hierarchy level above the first intermediate hierarchy level is associated with all the service instances of all hosts of one cluster of hosts; each QoS processing node of the highest hierarchy level above the second intermediate hierarchy level is associated with all the service instances of all clusters of one region of clusters.

A second aspect of this disclosure provides a method for QoS processing of one or more services, the method comprising: allocating or reallocating a plurality of QoS processing nodes in a hierarchical tree structure that includes at least two hierarchy levels; wherein a highest hierarchy level of the at least two hierarchy levels comprises one or more root nodes of the tree structure of the QoS processing nodes, each root node being associated with a set of service instances of the one or more services; wherein a lowest hierarchy level of the at least two hierarchy levels comprises a plurality of leaf nodes of the tree structure of the QoS processing nodes, each leaf node being associated with one service instance of the one or more services, each leaf node being descended from at least one root node, and the service instances of the set of service instances of each root node being associated to the leaf nodes descended from that root node; applying, by each leaf node, a local QoS policy to the service instance associated with that leaf node; and applying, by each root node, a first common QoS policy to the set of service instances associated with that root node.

In an implementation form of the second aspect, the hierarchical tree structure includes at least three hierarchy levels and the method further comprises: allocating or reallocating a plurality of intermediate nodes of the QoS processing nodes in at least one intermediate hierarchy level arranged between the highest and the lowest hierarchy level, each intermediate node being descended from at least one root node, each intermediate node being associated with a subset of service instances of the one or more services, and the service instances of the subset of service instances of each intermediate node being associated tot the leaf nodes descended from that intermediate node; wherein each intermediate node is configured to apply a second common QoS policy to its subset of service instances.

In an implementation form of the second aspect, the method comprises collecting, with each particular QoS processing node of the QoS processing nodes, at least one QoS metric of at least one service instance from each child node of the QoS processing nodes that is directly descended from the particular QoS processing node; aggregating the collected QoS metrics; and providing the aggregated QoS metrics to each parent node of the QoS processing nodes, from which the particular QoS processing node is directly descended.

In an implementation form of the second aspect, the method comprises receiving, with each particular QoS processing node of the QoS processing nodes, a QoS configuration for at least one service instance from each parent node of the QoS processing nodes, from which the particular QoS processing node is directly descended; and/or providing the received QoS configuration and/or an own QoS configuration for at least one service instance to each child node of the QoS processing nodes, which is directly descended from the particular QoS processing node.

In an implementation form of the second aspect, each root node distributes at least one rate limitation parameter for at least one service instance to each QoS processing node that is descended from that root node.

In an implementation form of the second aspect, each QoS policy, including each local QoS policy, each first common QoS policy and/or each second common QoS policy, is applied based on at least one of: one or more of the QoS metrics of the one or more service instances to which the QoS policy is applied; one or more of the QoS configurations for the one or more service instances to which the QoS policy is applied; one or more of the rate limitation parameters for the one or more service instances to which the QoS policy is applied.

In an implementation form of the second aspect, the local QoS policy, the first common QoS policy, and/or the second common QoS policy includes a rate-limiting policy.

In an implementation form of the second aspect, the method further comprises allocating and/or reallocating, with a control node, one or more of the plurality of QoS processing nodes in the hierarchical tree structure.

In an implementation form of the second aspect, the control node is one of the QoS processing nodes of the hierarchical tree structure.

In an implementation form of the second aspect, the control node performs the allocation and/or the reallocation based on at least one of: a load on the currently allocated QoS processing nodes, the QoS policies applied by the currently allocated QoS processing nodes, a communication cost among the currently allocated QoS processing nodes, a topology of the service instances, and a QoS configuration of each of the service instances.

In an implementation form of the second aspect, each QoS processing node in the hierarchical tree structure is aware of its position in the tree structure and/or comprises information describing the entire hierarchical tree structure.

In an implementation form of the second aspect, the QoS processing nodes in the hierarchical tree structure perform a consensus protocol to determine which QoS processing node is responsible for which QoS policy and/or a sharing of one or more QoS policies using the hierarchical tree structure.

In an implementation form of the second aspect, the control node reports an allocation and/or a reallocation of the one or more QoS processing nodes to all the QoS processing nodes.

In an implementation form of the second aspect, the hierarchical tree structure includes four hierarchy levels and wherein: each QoS processing node of the lowest hierarchy level is associated with one service instance of the one or more services of one host of a plurality of hosts, each host executing one or more service instances of the one or more services; each QoS processing node of a first intermediate hierarchy level above the lowest hierarchy level is associated with all the service instances of one host; each QoS processing node in a second intermediate hierarchy level above the first intermediate hierarchy level is associated with all the service instances of all hosts of one cluster of hosts; each QoS processing node of the highest hierarchy level above the second intermediate hierarchy level is associated with all the service instances of all clusters of one region of clusters.

The method of the second aspect and its implementation forms achieve the same advantages as described above for the QoS processing system of the first aspect and its respective implementation forms.

A third aspect of this disclosure provides a computer program comprising instructions which, when the program is executed by a computer, cause the computer to perform the method according to the second aspect or any of its implementation forms.

A fourth aspect of this disclosure provides a non-transitory storage medium storing executable program code which, when executed by a processor, causes the method according to the second aspect or any of its implementation forms to be performed.

In summary, this disclosure proposes a hierarchical QoS processing system using QoS processing nodes in a hierarchical tree architecture, and a QoS policy decision making using aggregation at different hierarchy levels. Further, the disclosure proposes an algorithm to allocate or reallocate the QoS processing nodes to process the QoS policies for different service instances. Various factors (e.g., load on the QoS processing nodes, QoS policies that are currently handled by the QoS processing nodes, cost of communication with a given QoS processing node) are considered to determine which QoS processing nodes should be responsible for handling QoS policies for services that belong to different tenants. The disclosure also proposes aggregation modes in each hierarchy level of the tree structure for better resource utilization It has to be noted that all devices, elements, units and means described in the present application could be implemented in the software or hardware elements or any kind of combination thereof. All steps which are performed by the various entities described in the present application as well as the functionalities described to be performed by the various entities are intended to mean that the respective entity is adapted to or configured to perform the respective steps and functionalities. Even if, in the following description of specific embodiments, a specific functionality or step to be performed by external entities is not reflected in the description of a specific detailed element of that entity which performs that specific step or functionality, it should be clear for a skilled person that these methods and functionalities can be implemented in respective software or hardware elements, or any kind of combination thereof.

BRIEF DESCRIPTION OF DRAWINGS

The above described aspects and implementation forms will be explained in the following description of specific embodiments in relation to the enclosed drawings, in which.

DETAILED DESCRIPTION

Figure 1:
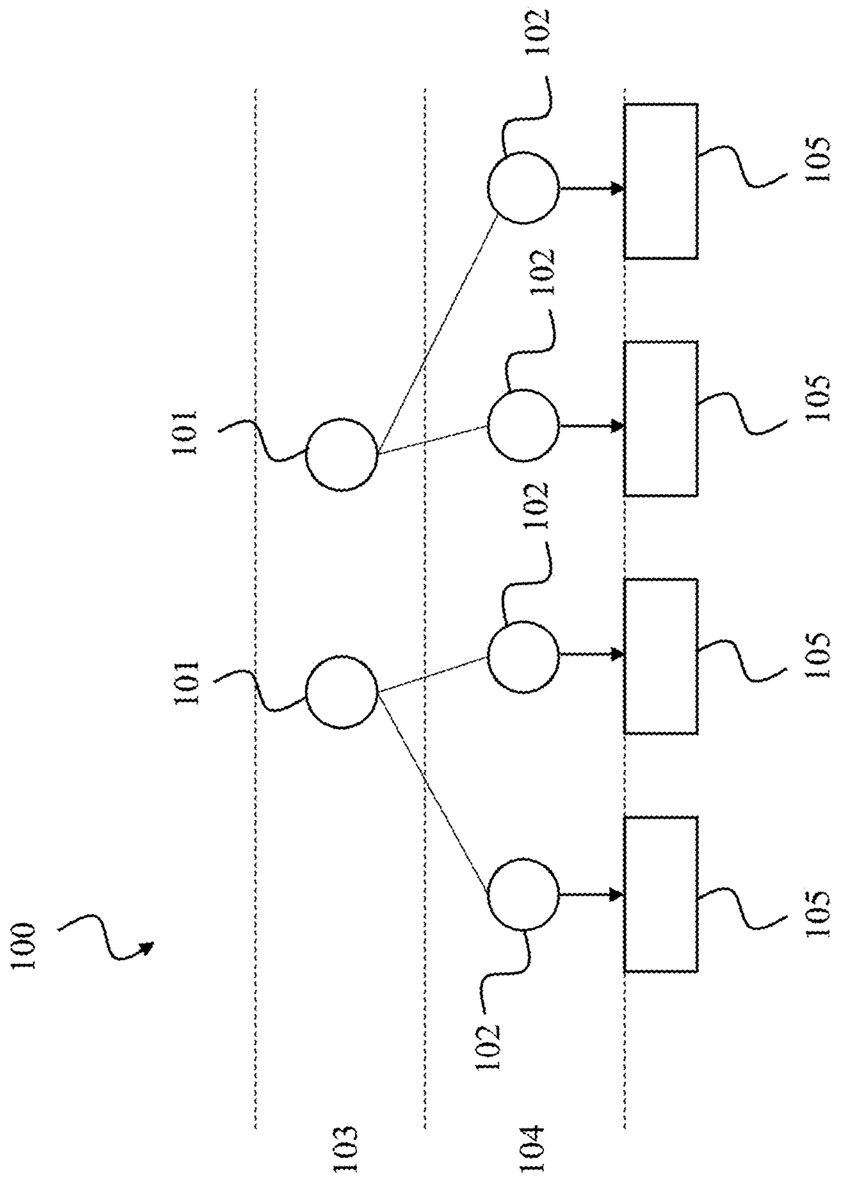
FIG. 1 shows a QoS processing system according to this disclosure with at least two hierarchy levels.

FIG. 1 shows a QoS processing system 100 according to this disclosure. The QoS processing system 100 is configured to process QoS of one or more services, in particular, by applying one or more QoS policies to the service instances 105 of the one or more services. The QoS processing system 100 comprises a plurality of QoS processing nodes 101, 102, which are arranged in a hierarchical tree structure including at least two hierarchy levels 103, 104. In FIG. 1, exactly two hierarchy levels 103, 104 are shown. However, this is only an example, and the hierarchical tree structure can comprise three hierarchy levels, or four hierarchy levels (like in FIGS. 3-7), or five hierarchy levels (like in FIG. 2), or even more.

As shown in FIG. 1, a highest hierarchy level 103 of the at least two hierarchy levels 103, 104 comprises one or more root nodes 101 of the hierarchical tree structure of the QoS processing nodes 101, 102. Each root node 101 is associated with a set of service instances 105 of the one or more services. Further, a lowest hierarchy level 104 of the at least two hierarchy levels 103, 104 comprises a plurality of leaf nodes 102 of the tree structure of the QoS processing nodes 101, 102. Each leaf node 102 is associated with one service instance 105 of the one or more services, each leaf node 102 is descended from at least one root node 101, and the service instances 105 of the set of service instances 105 of each root node 101 are associated to the leaf nodes 102 descended from that root node 101.

In the hierarchical tree structure of the QoS processing system, each leaf node 102 is configured to apply a local QoS policy to its associated service instance 105. Moreover, each root node 101 is configured to apply a first common QoS policy to its set of service instances 105. The local QoS policy is thus applied only to the associated service instance 105, while the common QoS policy is applied in a common manner to multiple service instances 105.

Each QoS processing node 101, 102 may comprise a processor or processing circuitry (not shown) configured to perform, conduct or initiate the various operations of the QoS processing node 101, 102 described herein. The processing circuitry may comprise hardware and/or the processing circuitry may be controlled by software. The hardware may comprise analog circuitry or digital circuitry, or both analog and digital circuitry. The digital circuitry may comprise components such as application-specific integrated circuits (ASICs), field-programmable arrays (FPGAs), digital signal processors (DSPs), or multi-purpose processors. Each QoS processing node 101, 102 may further comprise memory circuitry, which stores one or more instruction(s) that can be executed by the processor or by the processing circuitry, in particular under control of the software. For instance, the memory circuitry may comprise a non-transitory storage medium storing executable software code which, when executed by the processor or the processing circuitry, causes the various operations of the QoS processing node 101, 102 to be performed. In one embodiment, the processing circuitry comprises one or more processors and a non-transitory memory connected to the one or more processors. The non-transitory memory may carry executable program code which, when executed by the one or more processors, causes the respective QoS processing node 101, 102 to perform, conduct or initiate the operations or methods described herein.

Two main principles may be used according to this disclosure. Firstly, the multi-level hierarchical QoS processing nodes 101, 102. The QoS processing nodes 101, 102 may be configured for rate-limiter processing. Secondly, a dynamic sharding may be implemented to achieve, for instance, a shared-nothing (SN) in a multi-tenant deployment.

For instance, the QoS processing system 100 may be a rate-limiter system, which has a list of QoS processing nodes 101, 102 that are connected in a hierarchical order, i.e., in the hierarchical tree structure. The QoS processing nodes 101, 102 at each hierarchy level 103, 104 may communicate only with their respective parent nodes (which are QoS processing nodes arranged on one hierarchy level higher, from which the QoS processing nodes 101, 102 are descended) or their respective child nodes (which are QoS processing nodes on one hierarchy level lower, which are descended from the QoS processing nodes 101, 102), which may in overall be referred to as "north-south traffic". Adjacent QoS processing nodes 101, 102 on the same hierarchy level 103, 104 may not interact with each other for making any QoS policy decision. Instead, they may communicate with their parent or children nodes, respectively.

Each QoS processing node 101, 102 in each hierarchy level 103, 104 of the hierarchical tree structure may perform one or more of the following operations:

1. Collect relevant QoS metrics from its children node(s).
2. Aggregate the collected QOS metrics, for example, based on one or more QoS policies like rate-limiter policies.
3. Report the aggregated QoS metrics to its parent node (s), for instance, as configured by the QoS policies.
4. Poll QoS configuration(s) from its parent node(s).
5. Prepare a subset of the polled QoS configuration(s) and push the subset to its children node(s).

The leaf nodes 102 of the hierarchical tree structure are arranged at a service instance 105, where a local QoS policy may be applied. QoS policies, for instance rate-limiter policies, may be determined at the root nodes 101, for instance, by the customer. These QoS policies, for instance rate-limiter policies, may be propagated down all the way to the leaf nodes 102 (associated with the service instances 105) in regular intervals to make QoS decision(s) locally. Each QoS processing node 101, 102 in the hierarchical tree structure may be aware about its position (in the hierarchy), and may have a local copy of the hierarchical tree structure at all times. When the hierarchical tree structure is modified, the modification may be reported to all the QoS processing nodes 101, 102 on all the hierarchy levels 103, 104.

When one or more service instances 105 are started or stopped, this information may be propagated from the leaf nodes(s) up to the root node(s) 101, for instance, through intermediated QoS processing nodes in the hierarchical tree structure. The root node(s) 101 may then identify the QoS policies for the given service or service instance(s) 105, and may propagate it down to the QoS processing nodes 101, 102 in each hierarchical level 103, 104 including the leaf nodes 102. For example, a scheduler in each hierarchical level 103, 104 may determine who (e.g., which QoS processing node 101, 102) is responsible for that given service or service instance 105, and may assign that specific QoS processing node 101, 102 to the given service or service instance 105 for QoS policy handling, i.e., for applying the QoS policy. Next, the QoS processing nodes 101, 102 in each hierarchy level 103, 104 may be updated with a new parent node list that they have to interact with. This may be determined by the scheduler by using the list of services that a QoS processing node 101, 102 is responsible for, and the QoS policies that are being configured for the service as well. After the node list is updated, the QoS handling may be distributed across multiple QoS processing nodes 101, 102 using sharding.

The QoS processing system 100 may include at least three hierarchy levels 103, 104. For instance, FIG. 2 shows an example of a QoS processing system 100 according to this disclosure with five hierarchy levels 103, 204, 205, 206, 104.

The QoS processing system 100 may thus further comprise at least one intermediate hierarchy level 204, 205, 206 (e.g., three intermediated hierarchy levels in FIG. 2), which are arranged between the highest hierarchy level 103 and the lowest hierarchy level 104, and which comprise a plurality of intermediate nodes 201, 202, 203 of the QoS processing nodes 101, 102, 202, 202, 203. Each intermediate node 201, 202, 203 is descended from at least one root node 101. Each intermediate node 201, 202, 203 is further associated with a subset of service instances 105 of the one or more services, and the service instances 105 of the subset of service instances 105 of each intermediate node 201, 202, 203 are associated to the leaf nodes 102 descended from that intermediate node 201, 202, 203. Each intermediate node 201, 202, 203 is configured to apply a second common QoS policy to its subset of service instances 105.

Figure 2:
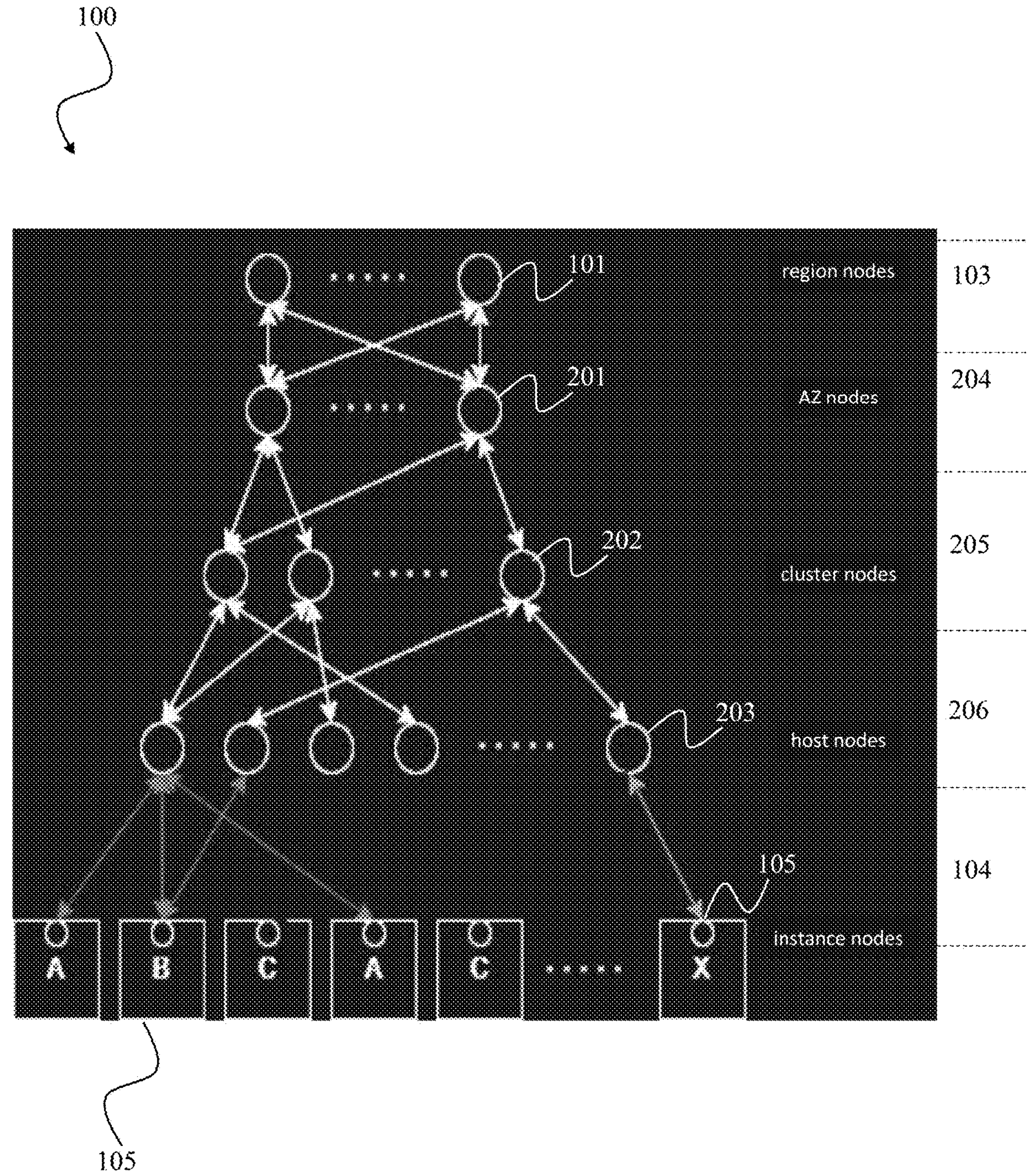
FIG. 2 shows a QoS processing system according to this disclosure with five hierarchy levels.
Figure 3:
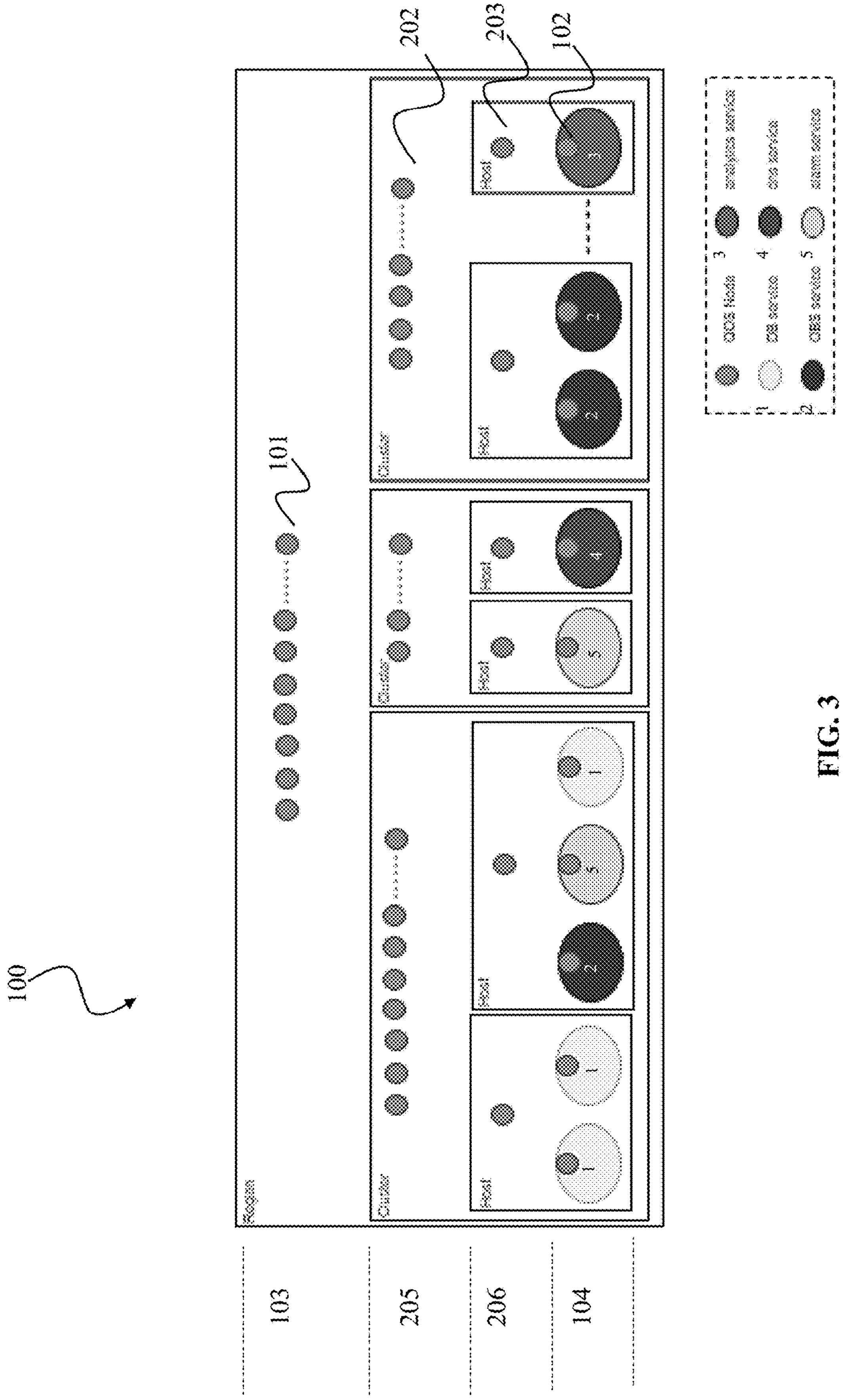
FIG. 3 shows a QoS processing system according to this disclosure with four hierarchy levels

As can be seen in FIG. 2, the QoS processing nodes 101, 102, 201, 202, 203 may be deployed at instance 105 (leaf nodes 102 at the hierarchy level 104), host (intermediate nodes 203 at hierarchy level 206), cluster (intermediate nodes 202 at hierarchy level 205), Availability Zone (AZ) (intermediate nodes 204 at hierarchy level 204), and region (root nodes 101 at the highest hierarchy level 103). The instance-level QoS processing node(s) 102 may be running as part of the application itself than a separate binary. Depending on the QoS policies being configured, specific allocated nodes 101, 201, 202, 203 may participate in the aggregation and processing of QoS metrics and policies of a given service.

FIGS. 3-7 show another example of a QoS processing system 100 with four hierarchy levels 103, 205, 206, 104. In this example, five cloud services (a DB service 1, an OBS service 2, an analytics service 3, a DNS service 4, and an alarm service 5) are shared by the QOS processing system 100, which is deployed for a single region. As can be seen from FIG. 3, there are QoS processing nodes 102 (leaf nodes, which may be implemented as an embedded library) inside each service instances 105. Also each host has its own intermediate QoS processing nodes 203 for the local QoS processing. At cluster level, there is a fleet of intermediate QoS processing nodes 202 deployed for QoS processing. The number of QoS processing nodes 202 in each cluster may vary based on the workload (e.g., number of services and QoS policies to be processed within the cluster). At region level, there is another fleet of QoS processing root nodes 101 configured to do the regional level QoS processing.

Figure 4:
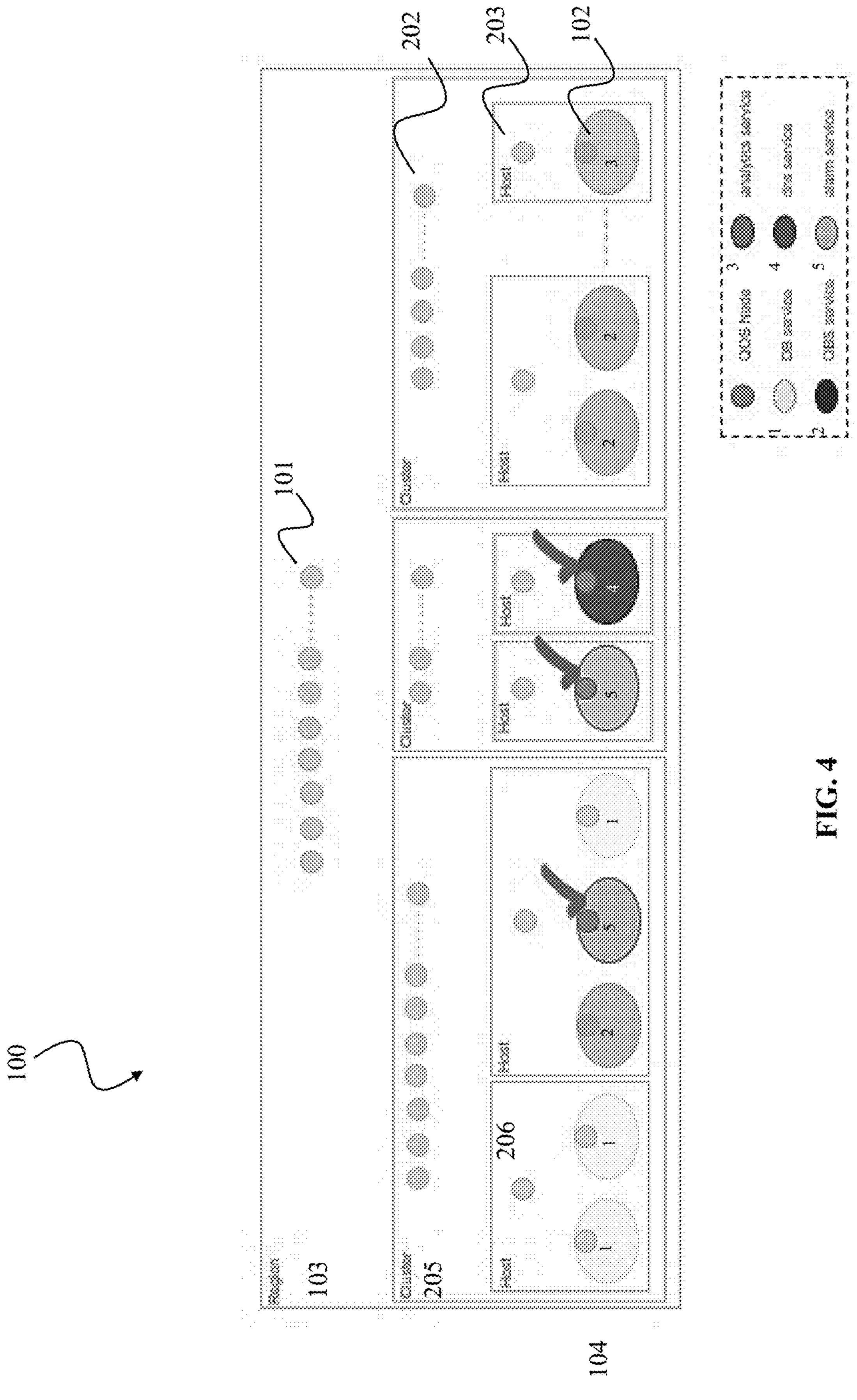
FIG. 4 shows a local QoS policy processing at service instances in the QoS processing system of FIG. 3.

Local QoS policy processing at the service instances 105 at the lowest hierarchy level 104 may work as described in the following with respect to FIG. 4. In this example, for instance, a domain name system (DNS) service has only single instances 105 present in the entire cloud. This means that the QoS processing can be done locally within the service instance(s) 105 itself without any distributed computing. The QoS processing system 100 may be aware about the service topology to determine the QoS processing nodes 102 to do the processing.

Similarly the alarm service may do the QoS processing locally, although it has more than one instance 105 across a cluster. This is, because when a QoS policy is local (e.g., it does not require any distributed calculation), only the local QoS processing nodes 102 may be used. In this example, the alarm service has all the policies that may be required to process QoS locally, so it is considered as local processing.

Figure 5:
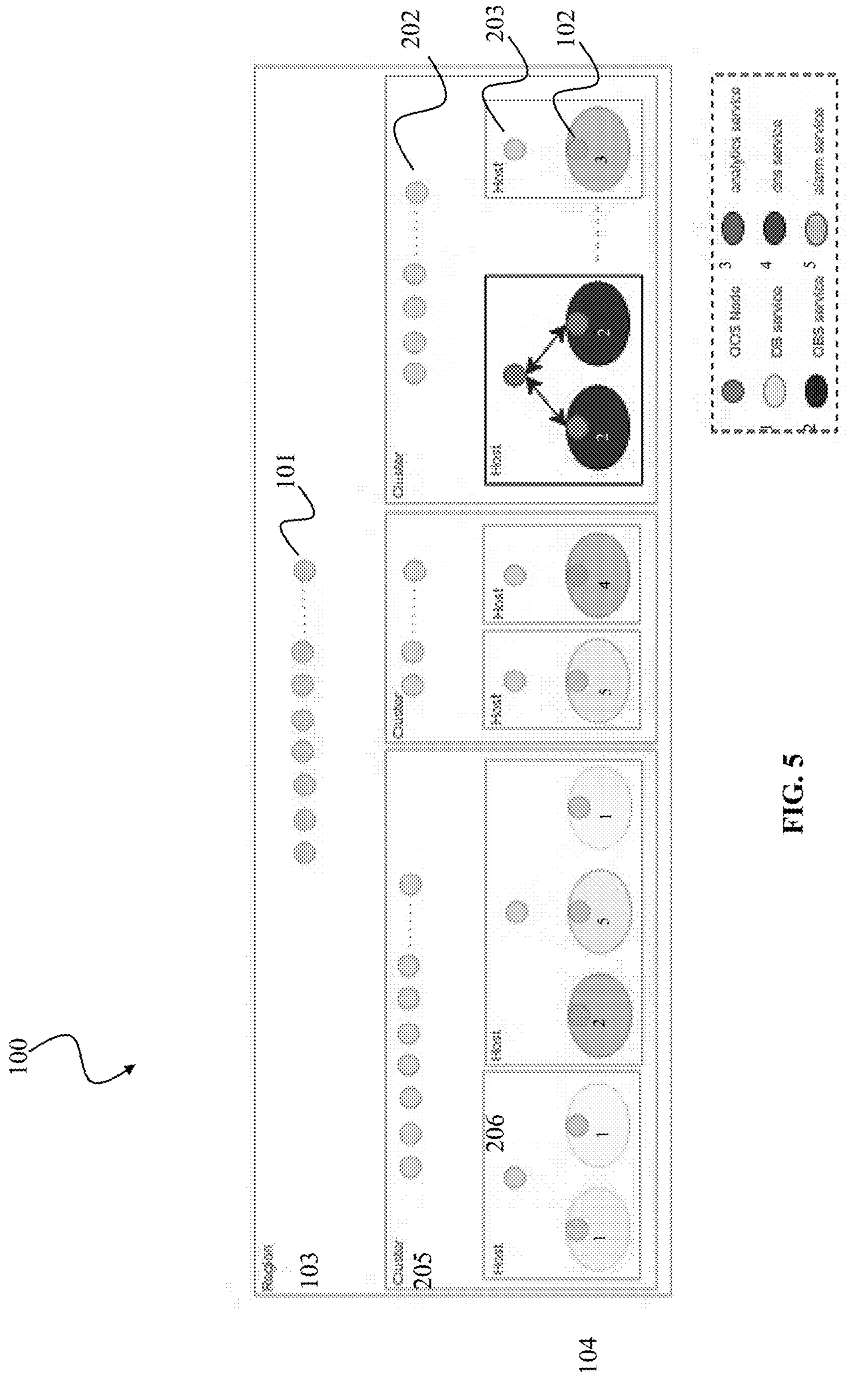
FIG. 5 shows a host-level QoS policy processing in the QoS processing system of FIG. 3.

Host-level QoS policy processing may work as described in the following with respect to FIG. 5. The host level is the next hierarchy level 205 in the hierarchical tree structure for QoS processing. Host-level QoS processing nodes 203 may take care of QOS processing of services that are in the same host. Alternatively, it may take care of QoS policies that are configured for a specific host. An OBS service may have a policy configured for a specific host, hence, it may be handled locally by the host-level QoS processing nodes 203 using the data from service instance QoS processing nodes 102.

Figure 6:
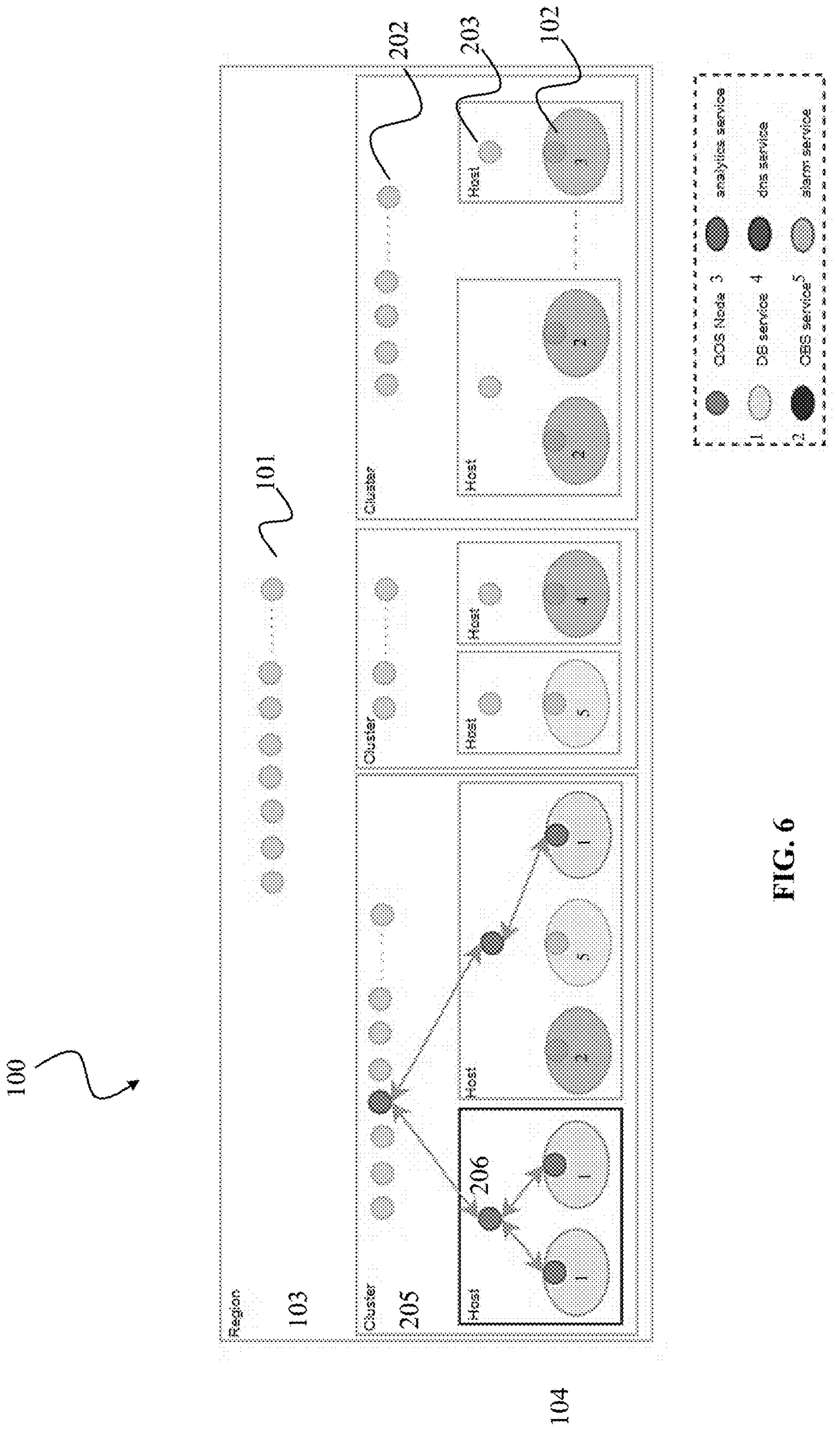
FIG. 6 shows a cluster-level QoS policy processing in the QoS processing system of FIG. 3.

Cluster-level QoS policy processing may work as described in the following with respect to FIG. 6. The next hierarchy level 205 of QoS processing is at cluster level. At cluster level, the QoS processing system 100 may use more than single QoS processing nodes 202, and a workload may being sharded across these intermediate QoS processing nodes 202. The sharding algorithm may run at cluster level and may make sure the intermediate QoS processing nodes 202 will not overload and that there will be no noisy neighbor situation. The sharding algorithm that is used may be solely determined by the application(s) and their deployment. Examples of usable algorithms are:

1. Service stickiness sharding algorithm: All the QoS policies for a given service is always handled in single QoS processing node 202.
2. Shuffle sharding algorithm: Shuffle the load across QoS processing nodes 202 based on policy, services, or even topology.
3. Random sharding algorithm: The service instances 105 are allocated randomly across the cluster QOS processing nodes 202.

In this example the database (DB) service is being span across a single cluster, hence, any QoS policy that is applied over the entire DB service will be handled at cluster level QoS processing nodes 202. For instance, it may block new DB connections from customers when a total of active DB connections from a customer is greater than 100. To apply a QoS policy like this, the QoS processing system 100 may need to collect the number of DB connections for each customer from all the active DB instances, and aggregate the values to determine if a connection needs to the blocked or not. After that, the decision should be posted to the QoS processing nodes where the request is being made. With this hierarchical model of this example, the first level of metric aggregation will happen at host level and then the result will be forwarded to cluster QoS processing nodes 202. At cluster level, these aggregated QoS metrics may be aggregated again to find the final value.

Figure 7:
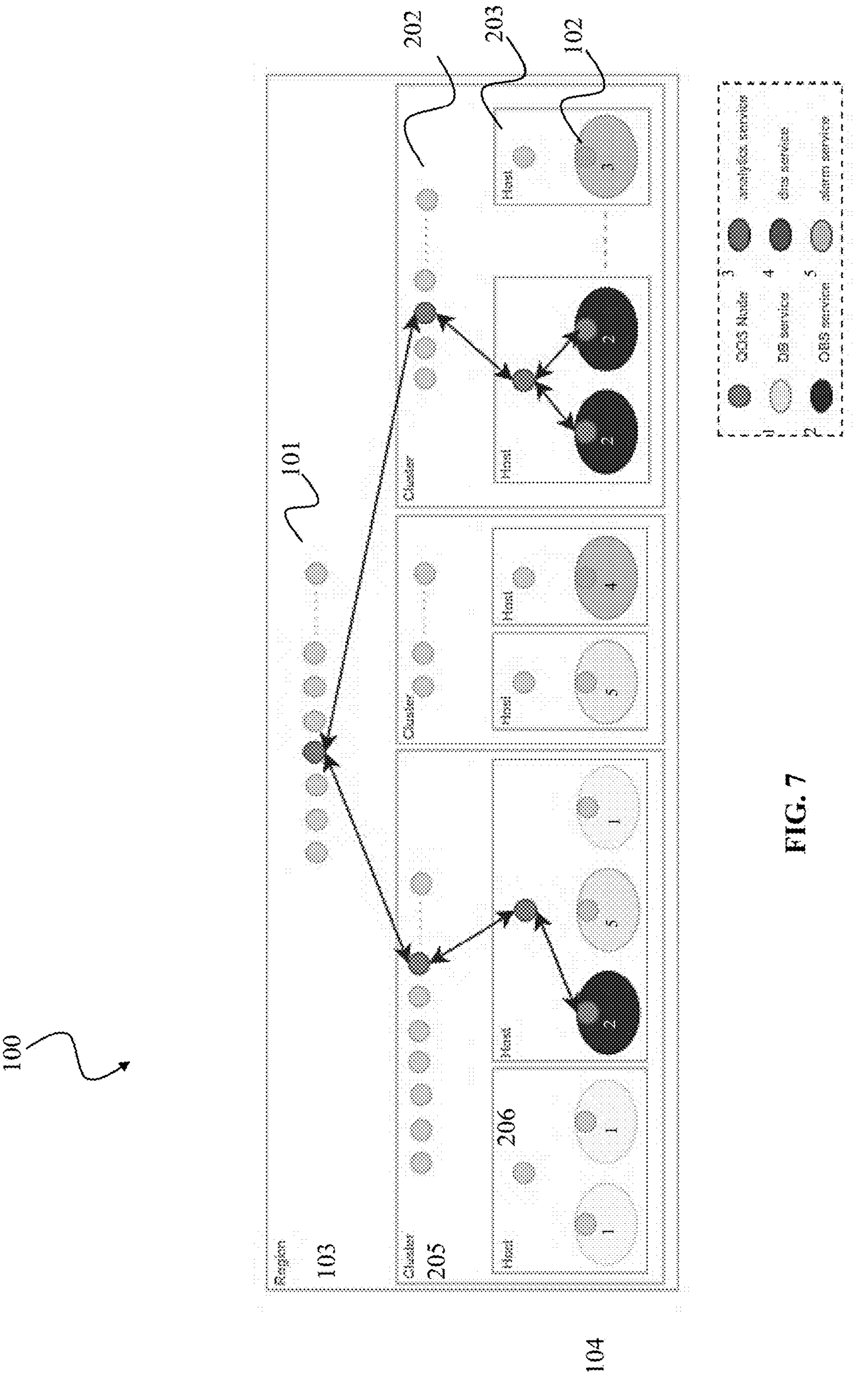
FIG. 7 shows a region-level QoS policy processing in the QoS processing system of FIG. 3.

Region level QoS policy processing is described in the following with respect to FIG. 7. Similar to the cluster-level QoS processing, there may be a fleet of regional QoS processing nodes 101 for regional-level policy handling. The regional-level QoS processing nodes 101 at the hierarchy level 103 may be sharded across different clusters based on various factors, such service topology, configured policies, network topology, and so on.

As can be seen, the OBS service may span across multiple clusters in a single region, and applying any policy for the entire OBS service may require policy management at the regional level. For example, it may block queries from customers, when the overall OBS CPU instance utilization is greater than 70%. To apply this kind of QoS policy, each service may have to report its CPU utilization to the next level QoS processing nodes. At each hierarchy level, the data may be aggregated, and aggregated data may be forwarded to all the way up to regional level QoS processing nodes 101. At the regional level, the final aggregation may happen, and the QoS policy decision may be made. This decision may be then pushed down the service QoS processing nodes to handle the queries properly.

Figure 8:
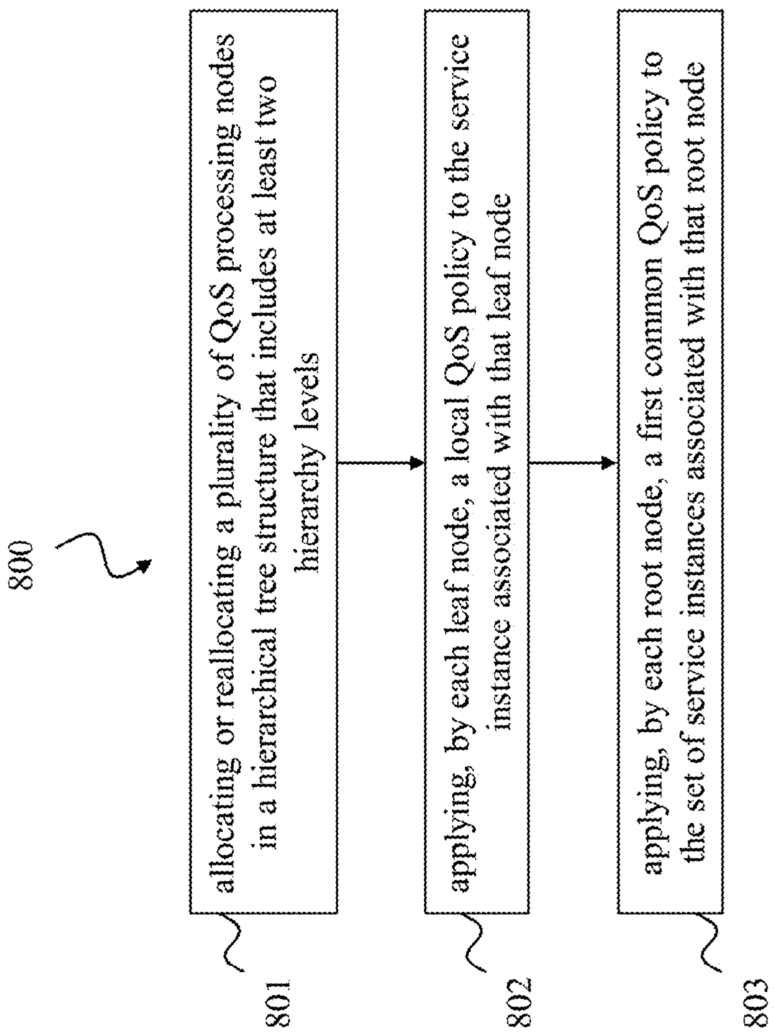
FIG. 8 shows a method for QoS processing of one or more services according to this disclosure.

FIG. 8 shows a method 800 according to this disclosure. The method 800 is for QoS processing of one or more services, and may be carried out by the QoS processing systems 100 shown in the FIGS. 1-7.

The method 800 comprises a step 801 of allocating 801 or reallocating a plurality of QoS processing nodes 101, 102, 201, 202, 203 in a hierarchical tree structure that includes at least two hierarchy levels 103, 104, 204, 205, 206. A highest hierarchy level 103 of the at least two hierarchy levels comprises one or more root nodes 101 of the hierarchical tree structure of the QoS processing nodes, each root node 101 being associated with a set of service instances 105 of the one or more services. A lowest hierarchy level 104 of the at least two hierarchy levels comprises a plurality of leaf nodes 102 of the hierarchical tree structure of the QoS processing nodes, each leaf node 102 being associated with one service instance 105 of the one or more services, each leaf node 102 being descended from at least one root node 101, and the service instances 105 of the set of service instances 105 of each root node 101 being associated to the leaf nodes 102 descended from that root node 101. The method 800 further comprises a step 802 of applying, by each leaf node 102, a local QoS policy to the service instance 105 associated with that leaf node 102. The method 800 also comprises a step 803 of applying, by each root node 101, a first common QoS policy to the set of service instances 105 associated with that root node 101.

The solutions of the present disclosure provide at least the following advantages. Scalability, in comparison to existing rate-limiting solutions, which are not at all scalable or usable to perform QoS across regions, and not even AZs. The present disclosure solves that issue by processing the QoS, e.g. rate-limiting, in a hierarchical model. Multi-tenant rate-limiting support, since the QoS processing nodes (e.g., rate-limiting nodes) are assigned across service instances 105 based on the QoS policies and service instance topology. This may assure that the QoS processing may not impact each other. It may also make sure that there are no noisy neighbor situations using this solution.

The solutions of this disclosure are suitable for large scale micro-service deployments, where one would like to apply rate-limiting policies across a large number of instances. The solutions of this disclosure is also most useful for large-scale applications that are shared across multiple users or tenants, who want to use the service in isolated mode. The solutions of this disclosure are also quite useful for some of large-scale deployments.

With a single hierarchical QoS processing solution, this disclosure can do QoS processing across all these instances without impacting each other. Each service instance 105 is associated to a leaf node 102 of the hierarchical tree structure. The total number of hierarchy levels 103, 104, 204, 205, 206 and the number of QoS processing nodes 101, 102, 201, 202, 203 in each hierarchy level may be completely based on the type of QoS policies and scale of application(s).

The present disclosure has been described in conjunction with various embodiments as examples as well as implementations. However, other variations can be understood and effected by those persons skilled in the art and practicing the claimed matter, from the studies of the drawings, this disclosure and the independent claims. In the claims as well as in the description the word "comprising" does not exclude other elements or steps and the indefinite article "a" or "an" does not exclude a plurality. A single element or other unit may fulfill the functions of several entities or items recited in the claims. The mere fact that certain measures are recited in the mutual different dependent claims does not indicate that a combination of these measures cannot be used in an advantageous implementation.

The invention claimed is:

1. A quality of service (QoS) processing system for one or more services, the QoS processing system comprising:

a plurality of QoS processing nodes arranged in a hierarchical tree structure that includes at least two hierarchy levels, wherein a highest hierarchy level of the at least two hierarchy levels comprises one or more root nodes of the hierarchical tree structure of the plurality of QoS processing nodes, each root node being associated with a set of service instances of the one or more services, wherein a lowest hierarchy level of the at least two hierarchy levels comprises a plurality of leaf nodes of the hierarchical tree structure of the plurality of QoS processing nodes, each leaf node being associated with one service instance of the one or more services, each leaf node being a descendant of at least one root node, and service instances of the set of service instances of each root node being associated to the leaf nodes descending from that root node, wherein each leaf node is configured to apply a local QoS policy to the associated service instance, and wherein each root node is configured to apply a first common QoS policy to the set of service instances associated with the respective root node.

2. The QoS processing system according to claim 1, wherein the hierarchical tree structure includes at least three hierarchy levels and the QoS processing system further comprises:

at least one intermediate hierarchy level arranged between the highest and the lowest hierarchy level and comprising a plurality of intermediate nodes of the QoS processing nodes, each intermediate node being a descendent of at least one root node, each intermediate node being associated with a subset of service instances of the one or more services, and the service instances of the subset of service instances of each intermediate node being associated to the leaf nodes descending from that intermediate node;

wherein each intermediate node is configured to apply a second common QoS policy to the subset of service instances.

3. The QoS processing system according to claim 1, wherein each particular QoS processing node of the QoS processing nodes is configured to:
  collect at least one QoS metric of at least one service instance from each child node that directly descends from the particular QoS processing node;
  aggregate the collected QoS metrics; and
  provide the aggregated QoS metrics to each parent node from which the particular QoS processing node has directly descended.

4. The QoS processing system according to claim 3, wherein:
  each QoS policy, including each local QoS policy, each first common QoS policy and/or each second common QoS policy, is applied based on at least one of:
  one or more of the QoS metrics of the one or more service instances to which the QoS policy is applied;
  one or more of the QoS configurations for the one or more service instances to which the QoS policy is applied;
  one or more of the rate limitation parameters for the one or more service instances to which the QoS policy is applied.

5. The QoS processing system according to claim 3, wherein the local QoS policy, the first common QoS policy, and/or the second common QoS policy includes a rate-limiting policy.

6. The QoS processing system according to claim 1, wherein each particular QoS processing node of the QoS processing nodes is configured to:
  receive a QoS configuration for at least one service instance from each parent node, from which the particular QoS processing node has directly descended; and/or
  provide the received QoS configuration and/or an own QoS configuration for at least one service instance to each child node which directly descends from the particular QoS processing node.

7. The QoS processing system according to claim 1, wherein each root node is configured to distribute at least one rate limitation parameter for at least one service instance to each QoS processing node that descends from that root node.

8. The QoS processing system according to claim 1, further comprising a control node configured to allocate and/or reallocate one or more of the plurality of QoS processing nodes in the hierarchical tree structure.

9. The QoS processing system according to claim 8, wherein the control node is one of the QoS processing nodes of the hierarchical tree structure.

10. The QoS processing system according to claim 8, wherein the control node is configured to perform the allocation and/or the reallocation based on at least one of: a load on currently allocated QoS processing nodes, QoS policies applied by the currently allocated QoS processing nodes, a communication cost among the currently allocated QoS processing nodes, a topology of the service instances, and a QoS configuration of each of the service instances.

11. The QoS processing system according to claim 8, wherein the control node is further configured to report an allocation and/or a reallocation of the one or more QoS processing nodes to all the QoS processing nodes.

12. The QoS processing system according to claim 1, wherein each QoS processing node in the hierarchical tree structure is aware of a position in the hierarchical tree structure and/or comprises information describing the entire hierarchical tree structure.

13. The QoS processing system according to claim 12, wherein the QoS processing nodes in the hierarchical tree structure are configured to perform a consensus protocol to determine which QoS processing node is responsible for which QoS policy and/or a sharing of one or more QoS policies using the hierarchical tree structure.

14. The QoS processing system according to claim 1, wherein the hierarchical tree structure includes four hierarchy levels and wherein:
  each QoS processing node of the lowest hierarchy level is associated with a service instance of the one or more services of one host of a plurality of hosts, each host executing one or more service instances of the one or more services;
  each QoS processing node of a first intermediate hierarchy level above the lowest hierarchy level is associated with all the service instances of one host;
  each QoS processing node in a second intermediate hierarchy level above the first intermediate hierarchy level is associated with all the service instances of all hosts of one cluster of hosts;
  each QoS processing node of the highest hierarchy level above the second intermediate hierarchy level is associated with all the service instances of all clusters of one region of clusters.

15. A method for quality of service, QoS, processing of one or more services, the method comprising:
  allocating or reallocating a plurality of QoS processing nodes in a hierarchical tree structure that includes at least two hierarchy levels;
  wherein a highest hierarchy level of the at least two hierarchy levels comprises one or more root nodes of the hierarchical tree structure of the plurality of QoS processing nodes, each root node being associated with a set of service instances of the one or more services;
  wherein a lowest hierarchy level of the at least two hierarchy levels comprises a plurality of leaf nodes of the hierarchical tree structure of the plurality of QoS processing nodes, each leaf node being associated with one service instance of the one or more services, each leaf node being a descendent of at least one root node, and service instances of the set of service instances of each root node being associated to the leaf nodes descending from that root node;
  applying, by each leaf node, a local QoS policy to the one service instance associated with that leaf node; and
  applying, by each root node, a first common QoS policy to a set of service instances associated with that root node.

16. A non-transitory computer readable medium comprising instructions which, when executed by a computer, cause the computer to perform the method according to claim 15.

* * * * *